Jan. 31, 1961   N. W. BURLIS ET AL   2,970,041
VOLUME-VARIATION MEASURING AND RECORDING APPARATUS
Filed March 9, 1960

INVENTORS,
NORBERT W. BURLIS
MILTON J. REINERT

BY Frank Groom Kirtz
ATTORNEY.

United States Patent Office 2,970,041
Patented Jan. 31, 1961

2,970,041

VOLUME-VARIATION MEASURING AND RECORDING APPARATUS

Norbert W. Burlis, St. Louis, and Milton J. Reinert, Ferguson, Mo., assignors to Custom Engineering and Development Co., a corporation of Missouri Filed Mar. 9, 1960, Ser. No. 13,797

4 Claims. (Cl. 23—256)

This invention consists of a volume-variation measuring and recording apparatus which operates under varying conditions down to very low pressure levels. It has been designed to measure extremely low volume changes in the gases or liquids employed, as well as measuring those volume changes at a constant pressure.

One of the advantages of the invention is the extreme simplicity of the operation of the fluid volume change measuring apparatus. Although extremely simple in construction, the device is completely automatic and therefore may be used in many applications such as the measurements of volumes of gases fed to and consumed in chemical reactions.

One of the objects of the invention is to provide a built-in or direct-writing recorder, which produces a continuous permanent record automatically without associated amplifiers and recording equipment.

Another object is to provide a device which can evaluate the metabolism characteristics of very small animals, such as mice, as well as small birds and the like. Because the continuous permanent record is made, it is possible to evaluate the variations in animal oxygen consumption rates. The instrument is designed to provide accurate automatic records of the time intervals occurring.

Another object of the invention is to provide a gas-uptake apparatus in which the movement of the recording pen in response to minute volume changes is derived directly from the relative movement of the piston-cylinder arrangement in which the gas is stored.

An additional object of the invention is to provide an instrument in which the requirement for a time-based chart drive on the recorder section is avoided by utilizing perpendicular or lateral motion of the pen derived from a timing motor cam to provide a time base.

These and other objects of the invention will be apparent to those skilled in the art to which the invention pertains, from a reading of the annexed drawing and the accompanying specification.

Figure 1:
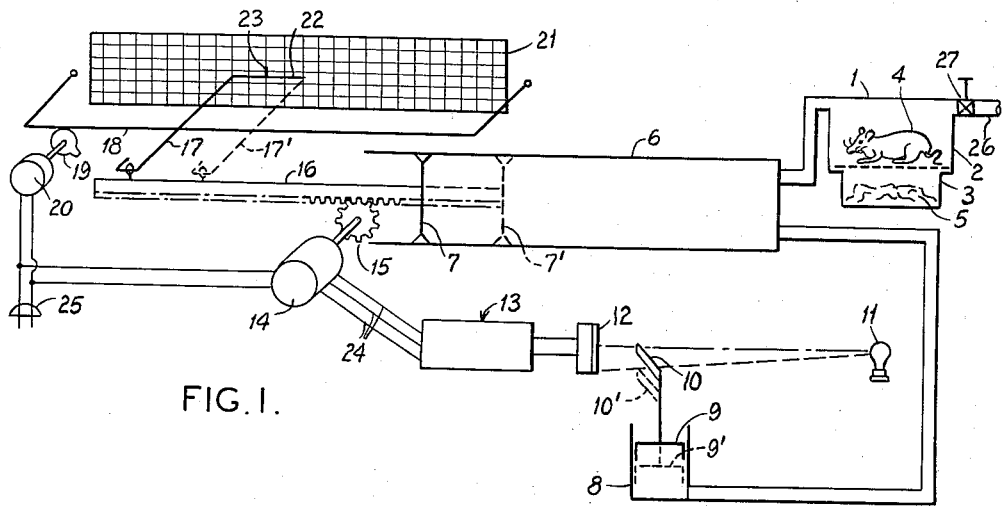
Figure 1 is a diagrammatic representation of the entire instrument with the electrical network represented by a labelled block.

In a chamber 1 are the compartment 2 and the communicating compartment 3. Compartment 2 contains a mouse 4; the communicating chamber 3 contains an absorbent 5 for carbon dioxide. The chamber 1 is connected by tubing to a storage vessel 6 consisting of a cylinder containing oxygen. The cylinder is closed at its other end and sealed by the piston 7. Connected to the vessel 6 by tubing is the volume transducer 8.

Volume transducer 8 contains a piston-like member in the form of an inverted cup 9, which is mounted in a frictionless manner and moves in a vertical sense in response to volumetric changes in the gas system. Chamber 1, storage vessel 6, and volume transducer 8, together with their connected tubing form a closed gas system for the purpose, in this case, of measuring the oxygen uptake of the mouse.

Mounted upon and above piston-like member 9 is the opaque screen 10, which is disposed in the path of light rays from the light source 11 to the photosensitive resistor 12. The photosensitive resistor 12 is electrically connected to the electrical network 13. The output of the electrical network 13 controls the rotative motion of the shaft of the drive motor 14. Mounted upon the shaft of the motor 14 is the pinion gear 15. Gear 15 meshes with rack gear 16, upon one end of which is mounted the piston 7. At the other end of rack gear 16 is mounted the recording pen 17, pivoted so that the pen 17 may move vertically with respect to the rack gear. Pen 17 rests on a U-shaped bar 18 pivotably mounted at both ends. Near one end of the bar 18 and in supportive contact with the bar is the cam 19, driven by the timing motor 20. Lying in writing contact with the recording pen 17 is the chart paper 21. Number 24 is given to the wires which connect the electrical network to the motor 14. The electrical power supply connector for the motors is numbered 25. The oxygen inlet line is 26 and the stopcock in the inlet line admitting oxygen is numbered 27.

In order to perform an oxygen uptake test on the mouse the piston 7 is moved to the far left of vessel 6 in Figure 1. Then the closed system consisting of chamber 1, vessel 6 and transducer 8 is flushed and charged with pure oxygen from inlet line 26. As the mouse 4 breathes, a certain percentage of the pure oxygen which it inhales will be converted to carbon dioxide. This carbon dioxide gas, upon exhalation, will be absorbed by absorbent 5.

Now in order to establish the range of the measurements which are made by this instrument, it must be realized that a given mouse may inhale 5–10 cubic centimeters of pure oxygen. When it has inhaled this however, the mouse volume has increased by approximately the same volume in cubic centimetres. The number of cubic centimetres of gas outside the mouse has been put inside the mouse hence it is important to realize that the total volume of the closed system has not been significantly changed by inhalation. Exhalation by the mouse does lead however to a change in the total volume. The absorbent is chosen such that it does not change volume when it absorbs carbon dioxide. For this purpose baralyme granules are used. Consequently, when a quantity of exhaled carbon dioxide is absorbed, a net reduction in the quantity of total amount of gas in the closed system occurs. For the case chosen, let us say that $\frac{1}{10}$ cc. per breath exhaled is converted to carbon dioxide. It is this $\frac{1}{10}$ cc. which the instrument responds to. This reduction in volume causes a relative movement of the piston-like member 9 in Figure 1 to the dotted line position 9'.

Movement of the piston-like member 9 moves the opaque screen 10 to the dotted line position 10'. While in position 10 the screen shades approximately one-half of the photosensitive surface of the resistor 12, the screen at 10' permits almost the entire photosensitive surface of the resistor 12 to be exposed to the rays of the light source 11. The increased illumination produces a signal in the electrical network 13 which is converted into a command to the motor 14 to rotate in that sense which will drive the rack 16 and piston 7 mounted thereon to the right in Figure 1. The piston moves to the right, to a position 7', where it has reduced the closed gas system volume by that amount which compensates for the amount of carbon dioxide absorbed by the absorbent 5.

At this point the volume transducer member 9 returns to its original full-line position, casting approximately one-half of the photosensitive resistor 12 into shadow, eliminating the command to the motor 14 from the electrical network 13. The piston remains therefore at the position 7' until the next reduction in gas volume. Since the mouse's breathing is regular but the absorption of the carbon dioxide is dependent upon the diffusion of the carbon dioxide to the absorbent, the reduction in total volume, in this case, does not proceed in the pulse-like fashion of the breathing pattern. In other words, for a series of breaths, the piston does not move in a series of steps but moves at an even rate, as the gas is absorbed, to the right in Figure 1.

Movement of the piston to 7' has caused the pen 17 to travel horizontally to the position 17'. In so doing the recording pen has drawn a line 22 on the chart 21. The length of this line 22 equals the distance traversed by the piston from position 7 to 7'. The diameter of the storage vessel 6 being known, the volume of the gas absorbed can readily be calculated. A choice of suitable divisions upon the chart paper 21 will enable the person conducting the test to read directly the gas volume reductions involved.

In order however to establish the conditions necessary to calculate the mouse metabolism rate or oxygen uptake, it is necessary to relate the consumption of oxygen to time. For this purpose, a timing motor 20 and its associated cam 19 are used in the following manner. The timing motor 20 is synchronous and consequently makes a fixed number of revolutions per hour. For every revolution of the motor 20 the cam 19 raises the U-shaped lifting bar 18 momentarily. Movement of the bar causes a vertical deflection of the pen 17, resulting in a pip 23 on the chart. The time between successive pips is constant, such as one minute, if the speed of the timing motor is one revolution per minute. Since the distance between successive pips corresponds to the volume of gas absorbed during that time, the person conducting the test can readily ascertain from the recording the volume of oxygen taken up by the mouse for any given interval of time, and can calculate such quantities as the average uptake rate or discover changes in the uptake rate.

The importance of this procedure is derived from its usefulness in tests in which for instance the mouse is injected with certain drugs or subjected to certain diseases to determine the effect upon oxygen uptake.

Since it is essential to this type of test and others of a similar nature to avoid disturbing the pressure in the compartment in which the animal resides, it is important to conduct this test with minimal variations in pressure. For this purpose, the volume transducer of Figure 2 was designed to detect changes of volume without requiring changes in pressure. This is an important object of the invention.

Figure 2:
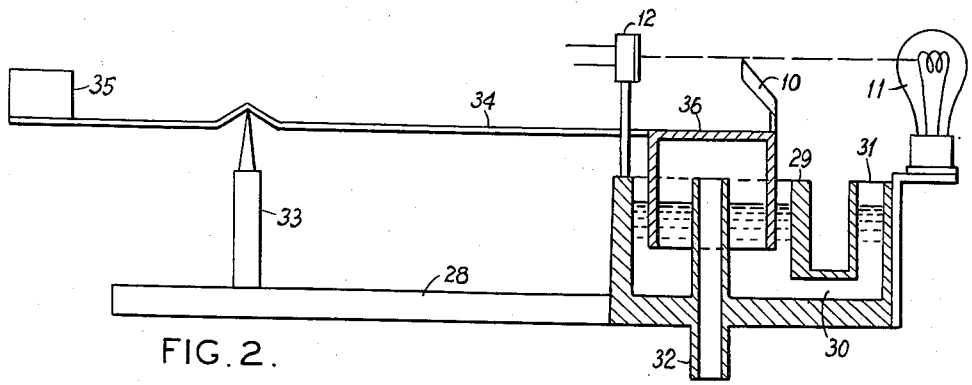
Figure 2 is an elevational view of the volume transducer partly in cross-section.

For the above purpose the volume transducer 8 of Figure 2 is shown to consist of a base 28, upon which is mounted integrally the cylindrical reservoir 29. The reservoir 29 is connected through the inlet 30 to the filling tube 31, whereby the reservoir is filled with water. Through the base 28 and along the vertical central axis of the reservoir 29 is disposed the fitting which is the gas input tube 32 which affords a port to the gas. Between the gas input tube 32 and the reservoir wall lies the water. Upon the base 28 is mounted the pivot 33, upon which is pivotally disposed the arm 34. Fastened to one end of arm 34 is the counterweight 35, and at the opposite end is the volume change detector 36, in the form of an inverted cup, the piston-like member 9 in Figure 1, with its open end extending below the surface of the water in the reservoir. It will be seen that the gas volume contained in the gas input tube 32 which connects to the closed system of the vessel 6 and the chamber 1 is sealed from the atmosphere by the water in the reservoir 29.

By choosing the proper size and position of the counterweight 35, the volume change detector 36 may be exactly counterbalanced and can travel vertically with a minimum force required to overcome the frictional force of pivot 33. For a net displacement of detector 36, there is only the minimal friction of the pivot and no force which is a function of the displacement as is required for a pressure transducer. Mounted upon the volume change detector is the opaque screen 10, which is interposed between the photosensitive resistor 12 which is itself mounted upon reservoir 29 and the light source 11 mounted upon the base 28.

When a volume change is experienced in the closed system, as in Figure 1, which is connected to 32 of Figure 2, this change in volume will raise or lower the volume change detector 36 in Figure 2. A critical point is that there is no pressure change in the closed system, since no force other than the trivial friction force, is required to move the volume change detector 36. Also since the volume change detector 36 is accurately counterbalanced by the counterweight 35, the pressure of the gas in the system will be equivalent to atmospheric.

Current is continuously passed through the photosensitive resistor 12. It is a characteristic of such resistors that an increase in light quantity, due in this case to movement of the screen 10 downward in Figure 2, will cause an increase in the current passing through the resistor. Contrariwise, upward movement of the screen 10 will cause a decrease in the light and a consequent decrease in the current. It can thus be seen that a change in volume of gas in the system will result in a corresponding change in the current through the photosensitive resistor 12.

Figure 3:
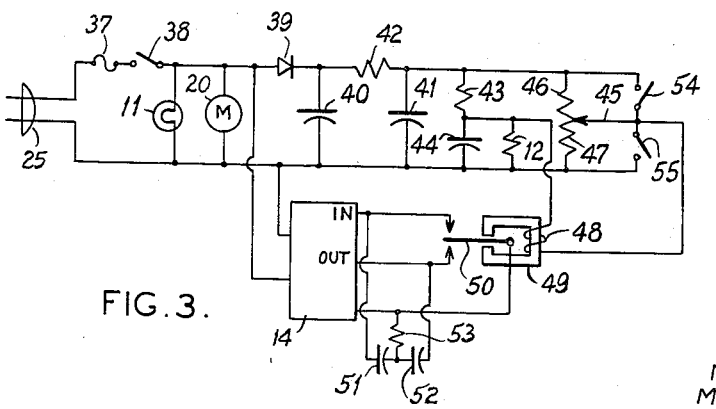
Figure 3 is a schematic of the electrical network with the addition of the power connections, the driving motor and the light source.

In Figure 3 is shown the electrical network 13 of Figure 1 in detail. A.C. power is supplied through the power supply connector 25, through the fuse 37 and the on-off switch 38 to the light source 11, the timing motor 20, the drive motor 14 and the network. The A.C. power is rectified by the diode 39 and further filtered by the pi-section filter consisting of the two capacitors 40, 41 and the resistor 42. Thus the rectified and filtered constant voltage appears across resistor 43 and the photosensitive resistor 12.

Capacitor 44 is connected in parallel with the photosensitive resistor 12 in order to filter out noise and therefore limit the signal to slowly varying direct current signals.

Under quiescent conditions, a given current is allowed to pass through resistor 12, establishing a voltage corresponding thereto across the photosensitive resistor. A voltage divider is provided, consisting of wiper arm 45, and the two resistor sections 46, 47. For the above quiescent condition the wiper arm 45 is adjusted so that the voltage across the resistor section 47 equals the voltage across the photosensitive resistor 12. Thus no current will flow in the winding 48 on the relay 49.

As has been described above, movement of the opaque screen 10 will cause changes in the amount of light impinging on the surface of the photosensitive resistor 12. An increase in light, due to a lowering of the screen, will cause a decrease in resistance of the photosensitive resistor 12. Thus the current through 12 and through the resistor 43 increases. This increased current will result in an increased voltage drop across resistor 43, thus decreasing the voltage across photosensitive resistor 12. Since the setting of the voltage divider remains constant, the voltage across the resistor section 47 is constant. Thus the increase in light quantity results in a net voltage appearing across the winding 48 of relay 49, causing a current to flow from wiper arm 45 through winding 48, and through photosensitive resistor 12.

The relay 49 is polarized and current in the above described direction will cause the contact arm 50 to move upward in Figure 3, causing the "in" connection of motor 14 to be made. This connection causes the motor to rotate in such a direction as to drive the rack 16 and the piston 7 of Figure 1, into the vessel 6. Movement of the piston inwardly compensates for the described reduction in the volume of the closed system, which allows the volume change detector 36 of Figure 2 to return to its normal position. At this point the light quantity impinging on the surface of the photosensitive resistor 12 returns to its quiescent value, thus the current through the winding 48 drops to zero and the relay contact arm 50 returns to the open position, and the motor comes to rest.

For other applications than the one described, it is required to provide compensation for increases as well as decreases in volume. In such uses, an increase in volume of gas in the closed system will cause the opaque screen to rise in Figure 2. Thus the current in the winding 48 will be in the opposite direction and the contact arm 50 will close in the opposite direction, making the "out" connection of motor 14. This connection causes the motor to rotate in the opposite sense and drive the rack 16 and the piston 7 of Figure 1, outwardly of the vessel 6. Movement of the piston outwardly compensates for the increased volume of gas in the closed system, and allows the volume change detector 36 of Figure 2 to return to its normal position. In the normal position again, the motor is turned off.

In Figure 3 capacitors 51, 52 and the resistor 53 constitute a filter network, the purpose of which is to limit the amount of arcing across the contacts of the relay 49. Switches 54 and 55 are directional override switches, provided to enable the experimenter to cause motion of the piston 7 in either direction, through the winding 48 and the motor 14, independently of internal volume changes in the closed system. When the override switches are employed when the system is closed, gas will escape, or be drawn into the system, in the form of bubbles, through the water in the reservoir 29.

It is important to note that all of the changes in volume described above were accomplished with virtually no changes in the pressure in the closed system.

In certain experiments it is desired to maintain a constant mixture of gases in the test chamber, such as 20% oxygen and 80% nitrogen for the mouse atmosphere. It is nonetheless possible to fill the storage vessel 6 with pure oxygen and supply replacement oxygen as it is consumed by the mouse. For this experiment a water trap can be employed to separate the vessel 6 from the chamber 1. In this case, however the volume transducer is connected by 32, directly to the chamber 1, and not to vessel 6. By so doing, the pressure required to drive oxygen through the water trap does not appear as a pressure change in the chamber 1.

This invention can also be used to measure variations in the volume of a system containing an incompressible liquid in an expansible chamber. The instrument has been employed to measure the expansibility of the blood vessels of a lung from a cadaver. The lung blood vessels were filled with plasma and the column of plasma from the lung fills the vessel 6. The gas input tube 32 contained a gas in contact with the column of plasma. The lung was then inflated and deflated artificially. Accompanying changes in the lung blood vessel volume were measured by the use of the invention. Thus the volume variations in a closed liquid system can be measured and recorded by means of this invention.

We claim:

1. A combination for measuring minute volume changes in a closed gas system consisting of a cylinder containing a gas of a given composition, a piston reciprocably mounted in said cylinder and sealing one end thereof, a rack gear carrying said piston, a chamber communicating with the opposite end of said cylinder in which a gas volume change reaction is taking place, a fluid reservoir provided with a port, a connecting fitting through said port extending above the fluid level in said reservoir, a counterbalanced inverted cup member disposed in said reservoir around said connecting fitting, said cup member communicating through said fitting with said cylinder and said chamber through the open bottom end of the cup and through said port, a light source and photosensitive resistor mounted on said reservoir, an opaque screen mounted on said cup member between said light source and said photosensitive resistor, a power supply and drive motor, an electrical network connected to said photosensitive resistor and said drive motor, a polarized relay and a voltage divider connected to said network to drive said rack gear and piston reciprocably with said motor in response to minute gas volume changes detected by movement of said inverted cup member, a recording pen mounted on said rack gear outside of said cylinder, said pen pivotable transverse to the direction of rack gear and piston travel in said cylinder, a pivotable U-shaped lifting bar against which said recording pen rests and a timing motor and associated cam in contact with said lifting bar to move said lifting bar and recording pen at regular time intervals transverse to the direction of pen and piston travel.

2. A combination for measuring minute volume changes in a closed gas system consisting of a cylinder containing a gas of a given composition, a piston reciprocably mounted in said cylinder and sealing one end thereof, a rack gear carrying said piston, a chamber communicating with the opposite end of said cylinder in which a gas volume change reaction is taking place, a cylindrical fluid reservoir provided with a port through the center of its base, a counterbalanced inverted cup member provided with an open bottom end partialy submerged in said reservoir, a connecting fitting through said port extending above the fluid level in said reservoir into the portion of the cup member above the fluid, said cup member communicating with said cylinder and said chamber through its open bottom end through said fitting and through said port, a light source and photosensitive resistor mounted on said reservoir, an opaque screen mounted on said cup member between said light source and said photosensitive resistor, said light source, resistor, screen, cup and reservoir transducing volumetric changes in said closed gas system into an electrical signal, a power supply and drive motor, a pinion gear on said motor engaging said rack gear, an electrical network connected to said photosensitive resistor and said drive motor, a relay actuated by said electrical signal through said electrical network to drive said rack gear and piston reciprocably with said motor in response to minute gas volume changes detected by movement of said cup and screen, a recording pen mounted on said rack gear pivotable transverse to the direction of rack gear and piston travel.

3. A combination for measuring minute volume changes in a closed fluid system consisting of a cylinder containing a fluid of a given composition, a piston reciprocably mounted in said cylinder and sealing one end thereof, a rack gear carrying said piston, a chamber communicating with the opposite end of said cylinder in which a fluid volume change reaction is taking place, a reservoir containing a second fluid provided with a port in its base, a counterbalanced inverted cup member disposed in said reservoir connecting lines between said cylinder and said chamber and said cup member, a known volume of a given gas in said cup member separating said second fluid in said reservoir from said first fluid in said connecting lines, said cylinder and said chamber, a light source and photosensitive resistor mounted on said reservoir, an opaque screen mounted on said cup member between said light source and said photosensitive resistor, a power supply and drive motor, an electrical network connected to said photosensitive resistor and said drive motor, a polarized relay and a voltage divider connected to said network to drive said rack gear and piston reciprocably with said motor in response to minute volume changes detected by movement of said inverted cup member, a recording pen mounted on said rack gear outside of said cylinder, said pen pivotable transverse to the direction of rack gear and piston travel in said cylinder.

4. A combination for measuring minute volume changes in a closed system containing an incompressible liquid consisting of a cylinder containing a liquid of a given composition, a piston reciprocably mounted in said cylinder and sealing one end thereof, a rack gear carrying said piston, an expansible chamber communicating with the opposite end of said cylinder in which liquid volume changes are taking place, a fluid reservoir provided with a port, a connecting fitting through said port extending above the fluid level in said reservoir, a counterbalanced inverted cup member disposed in said reservoir around said connecting fitting, said cup member communicating through said fitting with said expansible chamber and said cylinder through its open bottom end and through said fitting, a light source and photosensitive resistor mounted on said reservoir, an opaque screen mounted on said cup member between said light source and said resistor, a power supply and drive motor, an electrical network connected to said photosensitive resistor and said drive motor, a polarized relay and a voltage divider connected to said network to drive said rack gear and piston reciprocably with said motor in response to minute volume changes in said expansible chamber detected by movement of said inverted cup member and opaque screen, a recording pen mounted on said rack gear outside of said cylinder, said pen pivotable transverse to the direction of rack gear and piston travel.

References Cited in the file of this patent
UNITED STATES PATENTS
1,700,852    Packard et al. _____ Feb. 5, 1929